(12) United States Patent
Andersson

(10) Patent No.: US 7,128,088 B2
(45) Date of Patent: Oct. 31, 2006

(54) BACKFLOW PREVENTER

(75) Inventor: Bo Andersson, Cambridge, NY (US)

(73) Assignee: Danfoss Flomatic Corporation, Glens Falls, NY (US)

( * ) Notice: Subject to any disclaimer, the term of this patent is extended or adjusted under 35 U.S.C. 154(b) by 266 days.

(21) Appl. No.: 10/960,164

(22) Filed: Oct. 7, 2004

(65) Prior Publication Data

US 2006/0076062 A1    Apr. 13, 2006

(51) Int. Cl.
*F16K 15/06* (2006.01)
*F16K 17/06* (2006.01)

(52) U.S. Cl. ............... 137/512; 137/541; 137/542; 251/297

(58) Field of Classification Search ............ 137/512, 137/541, 542; 251/297
See application file for complete search history.

(56) References Cited

U.S. PATENT DOCUMENTS

| 144,844 | A | * | 11/1873 | Gould et al. ............ 137/541 |
| 2,267,902 | A | * | 12/1941 | Eddins ................ 251/297 |
| 2,701,579 | A | * | 2/1955 | Hasselquist ............ 251/297 |
| 2,711,186 | A | * | 6/1955 | Argibay ............... 251/297 |
| 4,232,704 | A | * | 11/1980 | Becker et al. ............ 137/512 |
| 4,284,097 | A | * | 8/1981 | Becker et al. ............ 137/512 |
| 5,085,076 | A | | 2/1992 | Engelmann ............. 73/197 |
| 5,113,899 | A | * | 5/1992 | Yonezawa ............. 251/297 |
| 5,584,315 | A | | 12/1996 | Powell ................ 137/15.18 |
| 5,711,341 | A | | 1/1998 | Funderburk et al. ...... 137/454.6 |
| 6,502,598 | B1 | | 1/2003 | Engelmann ............. 137/15.19 |

OTHER PUBLICATIONS

"The AMES Challenge", Ames Fire & Waterworks, Sacramento, CA, 4 pages.

* cited by examiner

*Primary Examiner*—John Rivell
(74) *Attorney, Agent, or Firm*—Heslin Rothenberg Farley & Mesiti P.C.

(57) ABSTRACT

A backflow assembly including a housing with a passage having at least one check valve positioned therein to permit fluid flow in one direction while preventing fluid flow in the reverse direction. The check valve includes a valve head connected to a stem having an outer surface. A hump extends radially outward from the outer surface of the stem. The stem is guided by a bushing during opening and closing of the valve. The bushing includes at least one retention member that moves along the outer surface of the stem during opening and closing of the valve. The interaction between the retention member and the hump on the outer surface of the stem causes a higher friction loss during opening and closing of the valve than other portions of the outer surface.

24 Claims, 6 Drawing Sheets

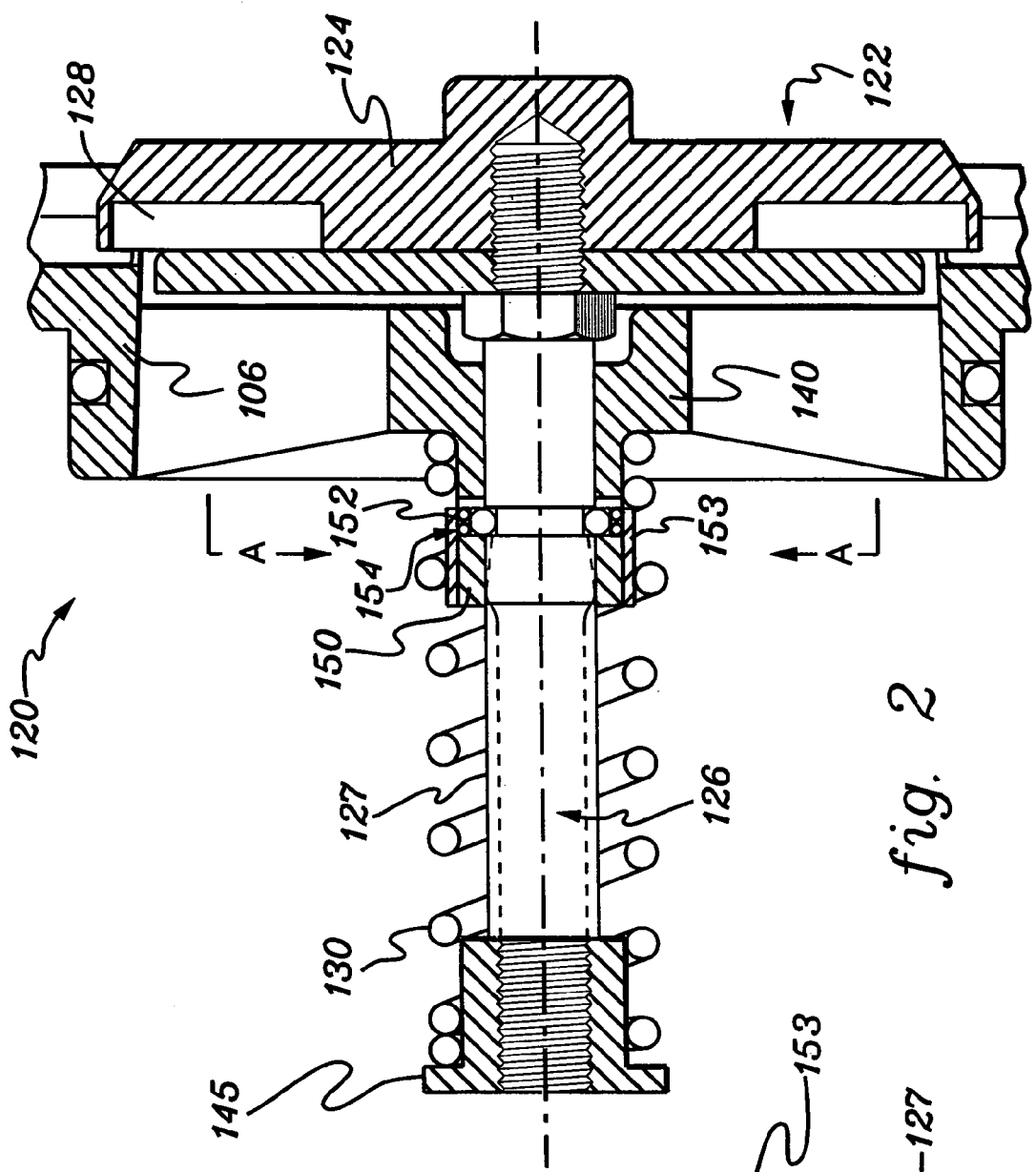
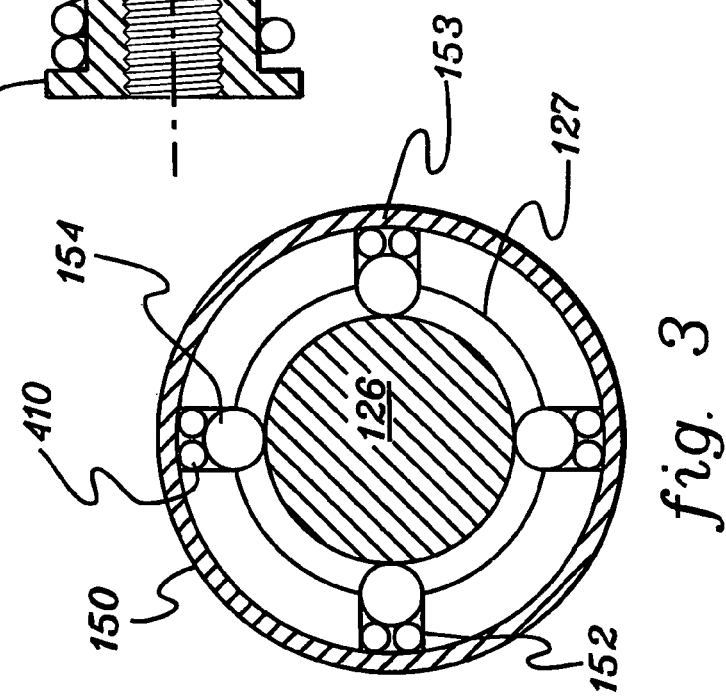

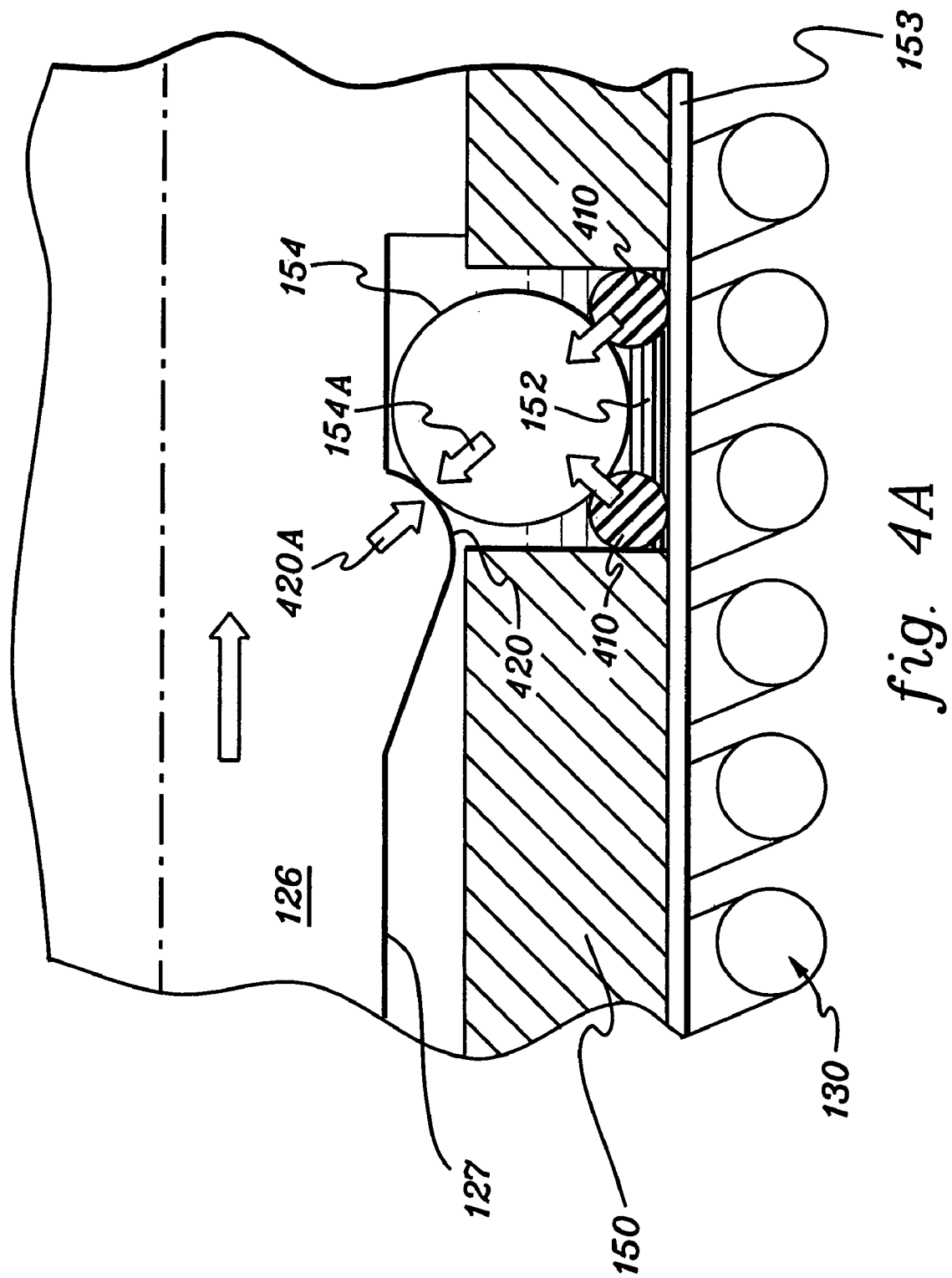

BACKFLOW PREVENTER

FIELD OF INVENTION

The present invention relates generally to a backflow preventer and check valve construction. More specifically, the invention relates to a valve assembly positioned within backflow preventers installed in water lines to prevent pollution of water supply systems during backflow conditions.

BACKGROUND OF THE INVENTION

Clean water supplies can become contaminated by hazardous connections to the piping system known as cross-connection. A cross-connection is a connection between a drinking water plumbing system and any other source that may contribute to the degradation of the quality of drinking water.

A backflow preventer is typically used to prevent contamination of a main water supply line by reducing or eliminating backflow of contaminated water into the supply line. A backflow preventer is installed in, for example, a pipeline between a main water supply line and a service line and designed to protect, for example, drinking water plumbing systems in accordance with national plumbing codes for non-health hazard and health hazard cross-connections and continuous pressure applications.

A conventional backflow preventer may include a single check valve unit or a pair of check valves arranged serially within a valve housing. A pair of check valves is commonly used in the event one of the valves fails. The housing includes a first port connected to the main water supply line and a second port connected to, for example, a service line leading to industrial and commercial water users. These preventers stop any reverse flow of liquid pollutants from those facilities into the main water supply system. In one application, a backflow preventer is installed in a fire sprinkler system to prevent backflow and subsequent cross contamination of old water that may exist in the fire sprinkler system from entering the main water supply system. Another typical installation is in the water supply line and fire lines to a hospital or an industrial facility.

During operation, water flow pressure urges the check valves into an open position, which allows water to flow freely through the valve. The check valves are normally spring loaded and biased into a closed position under no or minimal pressure and a backflow of liquid from the second port to the first port is prevented.

The pressure required to open a backflow preventer using check valves utilized in drinking water supply lines is established by regulation and provides a minimum degree of protection against reverse backflow. For example, backflow check valves used for fire-protection service are regulated by standards set by the Underwriters Laboratories Inc. and American National Standards Institute (ANSI). As one example, a double or single detector backflow check valve used in a fire sprinkler system must be design to meet the ANSI/UL 312-2003 Standard For Check Valves for Fire-Protection Services, which is hereby incorporated herein by reference. In use in a fire sprinkler system, the check valves are designed not to open (e.g. crack-open) until the pressure difference is one pound per square inch (1 PSI) across the check valve.

A potable water supply system must be designed, installed and maintained in such a manner so as to prevent contamination from nonpotable liquids, solids or gases. For use in drinking water supply lines, the backflow preventers should conform to the standards developed and set forth by the American Society of Sanitary Engineers (ASSE) and the Foundation for Cross-connection and Hydraulic Research (FCCHR), and the School of Engineering at the University of California. In use in drinking water supply lines, the first check valve in a backflow preventer using two check valves in series, are required not to open (e.g. crack-open) until the pressure differential is three pounds per square inch (3 PSI) across the check valve and at a minimum of one pound per square inch (1PSI) for the second check valve.

Conventional backflow preventers use check valves having a linear relationship between friction loss and the amount of flow. Specifically, a conventional check valve will open under a linear relationship between a minimal amount of pressure and a minimal amount of flow. However, when used in, for example, a domestic water supply, there are concerns about leaks and water theft.

In an effort to detect such events, backflow preventers are constructed to resist opening under a minimal amount of pressure and a bypass line is installed incorporating a water meter. When forward water flow produces only small forces (e.g. minimal amount of pressure) insufficient to separate the check valve from its valve seat, the water is directed through the meter in the bypass line and the check valve does not open. Current construction of these types of check valves, however, is complicated and expensive.

SUMMARY OF THE INVENTION

The shortcomings of the prior art may be alleviated by using a backflow preventor in accordance with one or more principles of the present invention. The backflow preventer may be used in any type of hydraulic or other fluid flow lines that is concerned with cross-contamination such as, for example, fire sprinkler systems or other clean water systems.

In one aspect of the invention, there is provided a backflow preventer. The backflow preventer includes, for instance, a housing having a passage therethough and a valve seat; at least one valve positioned in the passage, the at least one valve resiliently biased for closure with the valve seat to prevent fluid flow in a direction and to allow fluid flow in a reverse direction, the at least one valve includes a stem extending from a valve head engaging the valve seat, the stem having an outer surface with a hump extending radially outward along a portion of the outer surface; a valve guide, the valve guide guides the stem during opening and closing of the at least one valve, the valve guide including a bushing including at least one retention member, the at least one retention member engaging the outer surface of the stem, wherein the hump on the outer surface of the stem causes a higher friction loss during engagement with the at least one retention member than other portions of the outer surface of the stem during opening and closing of said at least one valve.

The backflow preventer constructed in accordance with the principles of the present invention offers more flexibility and compatibility with different situation by enabling a user to easily modify or fine tune certain aspects of the preventer to achieve a desired result. For example, modifications can be made to the profile of hump, the number of retention balls used, the geometry or material of retention balls, the geometry or material of o-rings or springs supporting retention balls in recesses, and/or changing the angled relationship between recesses housing the retention balls and the outer surface of the center stem. Each of these modifications can be made easily to the backflow preventer because of the ease of manufacturing the same. Moreover, the backflow preventer constructed in accordance with the principles of the present invention is not limited to only meet the standards and performance requirements specific to fire sprinkler systems or drinking water supply lines. Rather, the backflow preventer can be easily modified and adapted to conform to varies pressure differentials across the first and second check valves in series.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention are apparent from the following detailed description taken in conjunction with the accompanying drawings in which:

FIG. 2 depicts a cross-sectional view of one embodiment of a check valve constructed in accordance with the principles of the present invention;

FIG. 3 depicts a cross-sectional view of the check valve illustrated in FIG. 2 along the line A—A showing one embodiment of a retention bushing constructed in accordance with the principles of the present invention;

FIG. 4A depicts one embodiment of the interaction between a retention bushing and an outer surface of a valve constructed in accordance with the principles of the present invention;

FIG. 6 depicts one example of a graphical relationship between friction loss (in psi) and the distance a valve constructed in accordance with the principles of the present invention opens (in inches).

BEST MODE FOR CARRYING OUT THE INVENTION

Presented herein is an improved backflow preventer that provides the ability to easily fine tune its components to achieve a desired, predictable relationship between the amount of friction loss during opening and the distance the valve guide travels during opening and closing.

Figure 1:
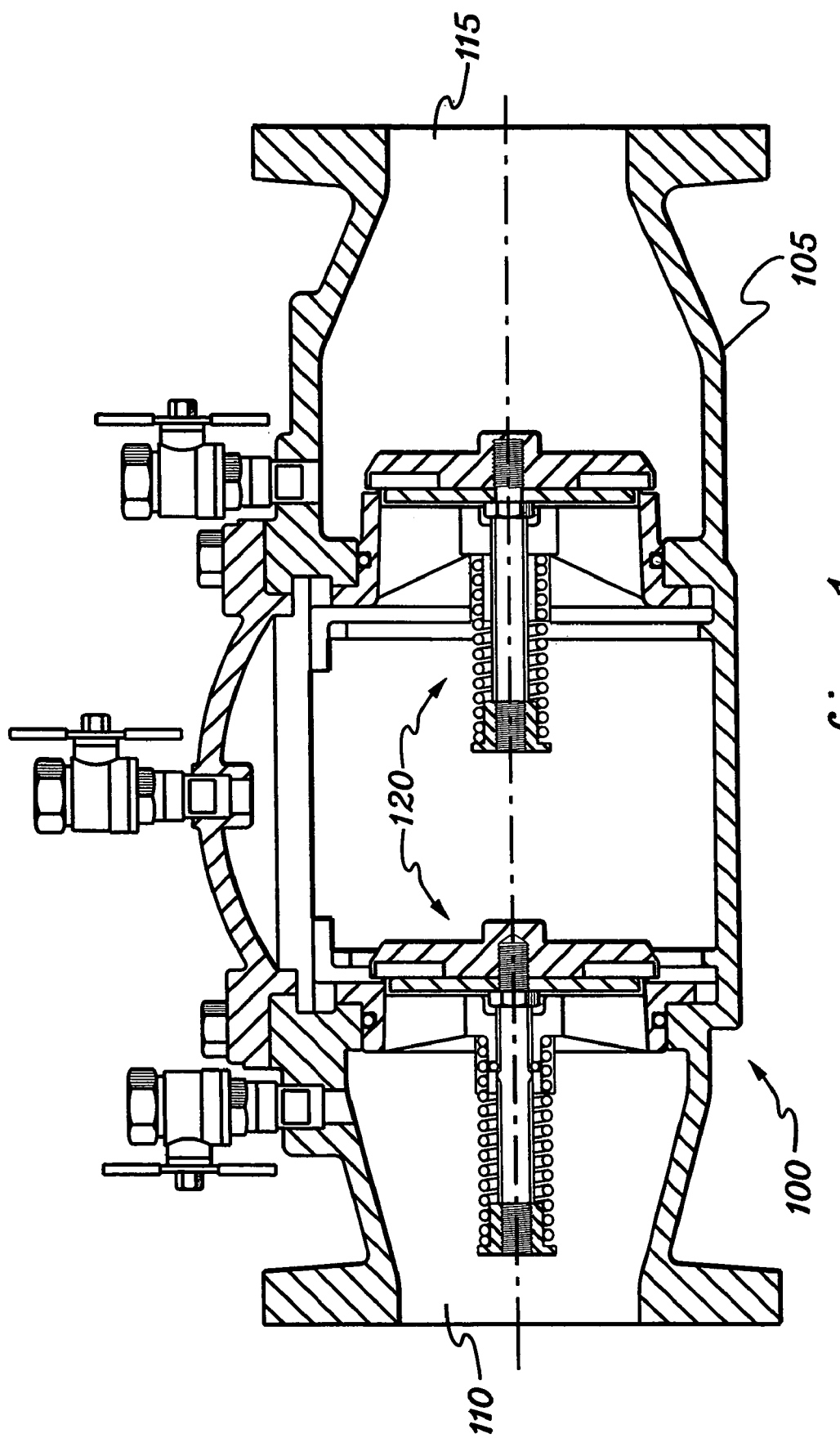
FIG. 1 depicts a cross-sectional view of one embodiment of a backflow preventer constructed in accordance with the principles of the present invention.

Referring to FIG. 1, a backflow preventer in accordance with the principles of the present invention includes a housing 105 having an inlet port 110 and an outlet port 115 that define the beginning and end of a water flow path though housing 10S. A pair of check valves 120 is located within housing 105 between inlet and outlet ports 110,115 to permit fluid flow from inlet port 110 to the outlet port 115 while preventing fluid flow in the reverse direction.

A check valve constructed in accordance with the principles of the present invention is generally shown in FIG. 2.

Each check valve 120 includes a valve plunger 122 including a head 124 and a center stem 126. Plunger head 124 mates with a valve aperture formed by a flange 106 on an inner surface of housing 105 of the backflow preventer. In one embodiment, plunger head 124 may include a rubber disk 128 that contacts the valve aperture and provides a seal with a valve seat during closing. Valve plunger 122 opens and closes the valve aperture depending on the pressure differential upstream and downstream of check valve 120. A spring 130 ensures reliable operation and biases check valve 120 in a closed position that prevents backflow. Valve plunger 122 also includes a stop member 145 that is configured and sized to engage an end of the spring and prevent the plunger from sliding entirely through the valve seat.

A valve guide 140 positioned along the longitudinal axis of check valve 120 guides center stem 126 of the check valve as the valve opens and closes. Valve guide 140 includes a retention bushing 150 surrounding a portion of outer surface 127 of center stem 126 near head 124 of valve plunge 122. Valve guide 140 is designed to keep the check valve in proper alignment to avoid jamming or sticking and serves as a bearing surface for smooth passage of center stem 126 during operation.

A backflow preventer is sometimes installed in a water line with a bypass water meter to detect leaks or water theft. In these applications, it is desired that the check valve resist opening under a minimal amount of pressure such as, for example, one psi of pressure. In this manner, the relationship between friction loss and flow rate is not linear, as typically found in conventional check valve. Instead, the relationship between friction loss and flow rate during minimal flow initially spikes upward such that the pressure to initially open the check valve increases rapidly. Once this initial friction is overcome, the friction loss significantly decreases or drops and a linear relationship is again established by spring 130. This function is also desirable in other applications, such as, for example, reduced pressure zone backflow preventers and other types.

In one embodiment of the present invention shown in FIG. 2, a retention bushing 150 achieves this higher desired opening pressure required by certain standards and regulation in certain applications. In this embodiment, valve guide 140 includes a retention bushing 150 extending along a portion of outer surface 127 of center stem 126 of valve plunger 122. Retention bushing 150 includes one or more recesses 152 spaced circumferentially around the interior of retention bushing 150 that each house a retention ball 154 (as shown in FIG. 3). Retention ball(s) 154, when installed over center stem 126 of valve plunger 122, interfaces with outer surface 122 of the valve plunger 126. In one embodiment, as shown in FIG. 4, retention ball(s) 154 is supported by and contacts o-rings 410 positioned within recesses 152. O-rings 410 are configured and sized to engage retention ball(s) 154 and compress and urge retention ball(s) 154 for engagement with outer surface 127 of center stem 126 during operation. In alternate embodiments, springs may be used in place of o-rings 410. Retention ball(s) 154 may be made from, for example, stainless steel, pressured stone or a composite material. The retention ball(s) and o-rings (or spring(s)) as an assembly are retained or captured in place by, for example, a retention sleeve 153, as shown in FIGS. 3 and 4A. In an alternative embodiment, the retention sleeve 153 is integrally formed with the retention bushing 150.

Figure 4B:
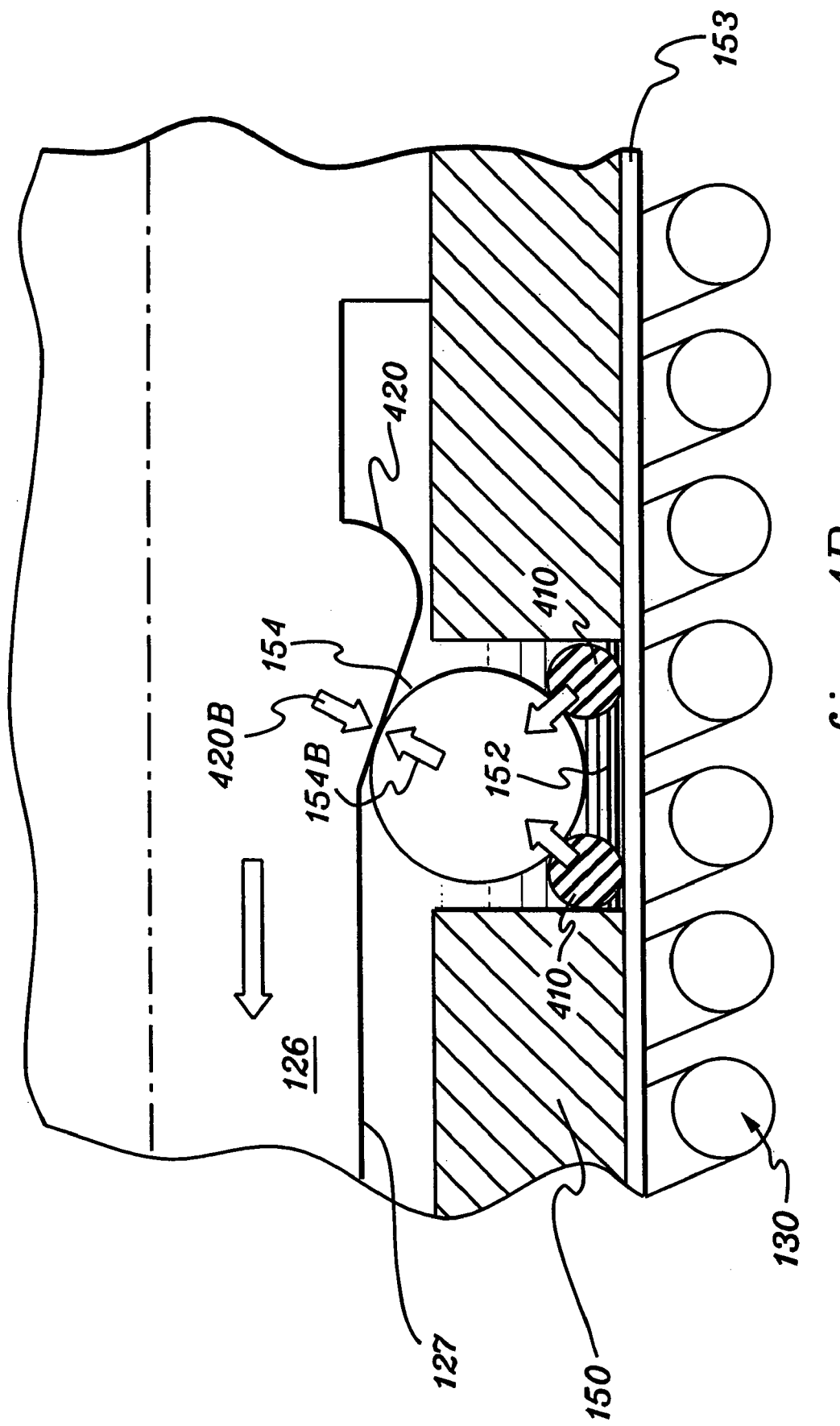
FIG. 4B depicts one embodiment of the interaction between a retention bushing and an outer surface of a valve, during closing, constructed in accordance with the principles of the present invention.
Figure 5:
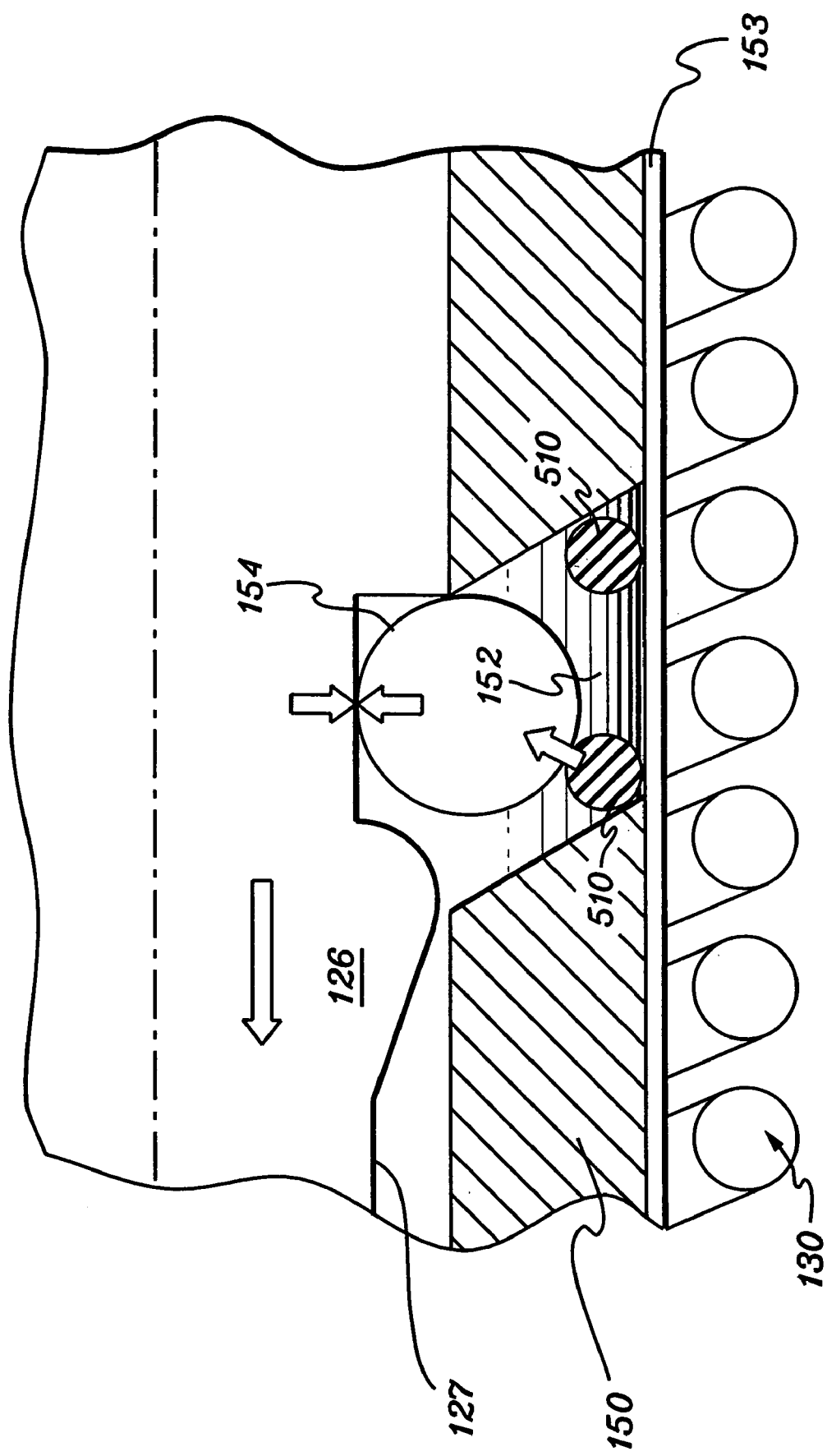
FIG. 5 depicts another embodiment of depicts one embodiment of the interaction between a retention bushing and an outer surface of a valve, during opening, constructed in accordance with the principles of the present invention.
Figure 9:
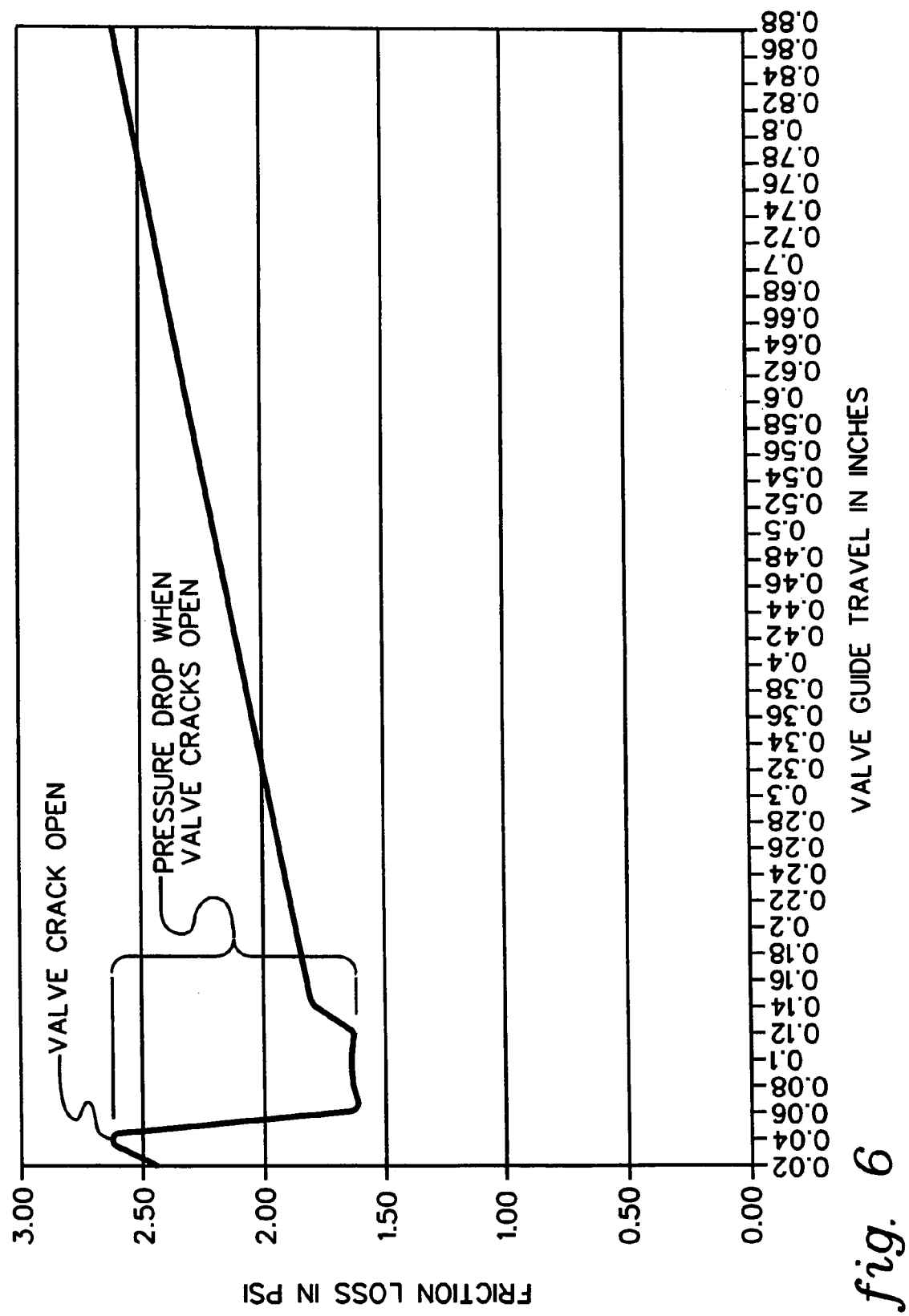

Recesses 152 may be, for example, arranged perpendicular to the outer surface 127 of center stem 126 of valve plunger 122, as shown in FIG. 4A, or, in an alternate embodiment, angled in relation to outer surface 127, as shown in FIG. 5. An angled relationship with outer surface 127 of the valve plunger 122 creates more friction loss as the check valve opens and closes.

The retention balls housed in retention bushing 150 interact and engage with a circumferential hump or ridge 420 extending radially outward from outer surface 127 of center stem 126 of valve plunger 122 during opening and closing. The more retention balls utilized, the higher force required to overcome the circumferential hump 420, as additional friction forces are created. In one embodiment, the radial distance of hump 420 from the outer surface of center stem initially increases sharply and then gradually decreases the farther away from valve head 124. This initial radial increase causes the higher pressure required to open the valve by creating a high friction area between the interface of retention ball 154 and hump 420 of center stem 126, known in the industry as "cracking pressure". Therefore, more pressure is required from the fluid flow to overcome this portion of hump 420. During closing, no such high pressure is required.

During opening as shown in FIG. 4A, retention ball 154 is pushed down in space 152, drags and turns in the direction away from the friction requiring a higher pressure from the fluid flow to open the valve. Once retention ball 154 overcomes this initial portion of hump 420, the friction loss decreases significantly as retention ball 154 slides or moves down the remaining back slope portion of hump 420 and less pressure is required to overcome spring 130 so that the check valve can further open. Arrows 420A and 154A show the changing spherical frictional contact between hump 420 and retention ball 154. FIG. 4B shows the interaction between retention balls 154 and hump 420 during closing. Arrows 420B and 154B in FIG. 4B show the frictional contact between hump 420 and retention ball 154 during closing. Retention ball 154 also drags and turns in a direction away from the friction, but because of the gradually sloped contour of hump 420, the friction loss is less during closing than during opening.

One example of the relationship between the friction loss in pounds per square inch and the amount the valve, constructed in accordance with the principles of the present invention, opens is provided in FIG. 6. As shown in FIG. 6, the friction loss initially spikes upward, while the retention ball(s) 154 overcome hump 420 on outer surface 127 of center stem 126 of valve plunger 122, and then falls rapidly downward, after retention ball(s) 154 pass the apex of the hump 420, and thereafter gradually increases in a linear relationship because a fixed resistance comes from spring 130. The relationship between friction loss and opening distance shown in the curve in FIG. 6 can be fine tuned or altered to a desired result by, for example, modifying the profile of hump 420, modifying the geometry or material of retention balls 154, modifying the geometry or material of o-rings or springs 410 supporting retention balls 154 in recesses 152, and/or changing the angled relationship between recesses 152 and outer surface 127 of center stem 126.

In another alternative embodiment, the hump may be extend inwardly from the inner surface of the bushing and the retention balls may be mounted on the center stem of the valve. In yet another embodiment, the backflow preventer includes a water meter straddling the two valves. The water meter includes an inlet in fluid communication with a downstream side of a first valve and an outlet in fluid communication with an upstream side of a second valve used in, for example, a fire sprinkler system to prevent cross contamination of drinking water.

In sum, the backflow preventer constructed in accordance with the present invention includes a check valve 120 that initially resists opening due to a retention bushing 150. Retention bushing 150 imposes a higher opening pressure on the valve than the force required to close the valve. Retention bushing 150 includes retention ball(s) 154 that engage a circumferential hump 410 on outer surface 127 of center stem 126 of valve plunger 122. Hump 460 is configured to initially resist retention ball(s) 154 from moving along center stem 126 by causing significant friction loss and preventing opening of the valve under nominal flow pressure. Once retention ball(s) 154 overcomes this hump, lower friction loss occurs and retention ball(s) 154 are permitted to more easily move along center stem 126 for further opening. During closing, a lower pressure is required and spring 130 biases the valve closed.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A backflow preventer, said backflow preventer comprising:
    a housing having a passage therethough and a valve seat;
    at least one valve positioned in the passage, said at least one valve resiliently biased for closure with the valve seat to prevent fluid flow in a direction and to allow fluid flow in a reverse direction, said at least one valve includes a stem extending from a valve head engaging the valve seat, the stem having an outer surface with a hump extending radially outward from the outer surface along a portion of the outer surface; and
    a valve guide, said valve guide guides the stem during opening and closing of said at least one valve, said valve guide including a bushing having at least one retention member, said at least one retention member engaging the outer surface of the stem, wherein said hump on the outer surface of the stem causes a higher friction loss during engagement with the at least one retention member than other portions of the outer surface of the stem during opening and closing of said at least one valve.

2. The backflow preventer of claim 1, wherein the friction loss is greater when the at least one retention member engages the hump during opening than during closing of said at least one valve.

3. The backflow preventer of claim 1, wherein the at least one retention member requires at least 1 pounds per square inch of fluid flow to overcome the hump on the outer surface of said stem.

4. The backflow preventer of claim 1, wherein a first valve and a second valve are positioned in the passage.

5. The backflow preventer of claim 4, further comprising a water meter, said water meter having an inlet and an outlet, wherein the inlet is positioned to an upstream side of the first valve and the outlet is positioned to a downstream side of the second valve.

6. The backflow preventer of claim 1, wherein the retention bushing includes a plurality of retention members spaced circumferentially around the retention bushing for engagement with the hump.

7. The backflow preventer of claim 1, wherein the at least one retention member is received in a recess formed in an inner surface of the bushing.

8. The backflow preventer of claim 7, wherein at least one compression member is positioned within the recess and engages the at least one retention member.

9. The backflow preventer of claim 8, wherein the at least one compression member is an o-ring.

10. The backflow preventer of claim 9, wherein the at least one retention member and the at least one compression member are retained in place in the recess formed in the inner surface of the bushing by a retention sleeve on an outer surface of the bushing.

11. The backflow preventer of claim 8, wherein the at least one compression member is a spring.

12. The backflow preventer of claim 11, wherein the at least one retention member and the at least one compression member are retained in place in the recess formed in the inner surface of the bushing by a retention sleeve on an outer surface of the bushing.

13. The backflow preventer of claim 1, wherein a spring biases the at least one valve for closure.

14. The backflow preventer of claim 1, wherein the at least one retention member is a ball.

15. The backflow preventer of claim 14, wherein the ball is made from stainless steel.

16. A backflow preventer, said backflow preventer comprising:
   a housing having a passage therethrough;
   at least one valve assembly positioned in the passage to prevent fluid flow in a direction and to allow fluid flow in a reverse direction, said at least one valve comprising:
      a head;
      a stem extending from said head, said stem having an outer surface, wherein a portion of the outer surface includes a hump extending radially outward; and
      a bushing, said bushing guides the stem during opening and closing of said at least one valve, said bushing including at least one retention member, said at least one retention member moves along the outer surface of said stem during opening and closing of said at least one valve.

17. The backflow preventer of claim 16, wherein said at least one retention member is received in a recess formed in an inner surface of said bushing.

18. The backflow preventer of claim 17, wherein side walls defining the recess formed in the inner surface of said bushing are angled in relation to a longitudinal axis of said stem.

19. The backflow preventer of claim 16, wherein said bushing includes a plurality of retention members spaced circumferentially around the bushing.

20. The backflow preventer of claim 16, wherein the hump extending radially outward from the outer surface of said stem is located in close proximity to the head such that a higher pressure is required for the at least one retention member to move over the hump than to move along other portions of the outer surface of said stem.

21. The backflow preventer of claim 20, wherein the pressure for the at least one retention member to move over the hump during opening of the at least one valve is greater than the pressure for the at least one retention member to move over the hump during closing of the at least one valve.

22. The backflow preventer of claim 16, wherein the radial distance of the hump increases and then decreases along the outer surface of said stem away from said head.

23. The backflow preventer of claim 22, wherein the radial distance of the hump increases at a faster rate than it decreases along the outer surface of said stem away from said head.

24. A backflow preventer, said backflow preventer comprising:
   a housing having a passage therethrough;
   at least one valve assembly positioned in the passage to prevent fluid flow in a direction and to allow fluid flow in a reverse direction, said at least one valve comprising:
      a head;
      a stem extending from said head, said stem having a longitudinal axis and an outer surface, wherein a portion of the outer surface includes a portion having a greater radial distance from the longitudinal axis than other portions of the outer surface; and
      a bushing, said bushing guides the stem during opening and closing of said at least one valve, said bushing including at least one retention member, said at least one retention member moves along the outer surface of said stem during opening and closing of said at least one valve, wherein greater friction loss results when the at least one retention member moves along the portion of the outer surface having a greater radial distance from the longitudinal axis than along other portions of the outer surface.

* * * * *